Aug. 26, 1930.  C. R. JENKINS  1,774,201
HOLDER DEVICE
Filed Sept. 9, 1929
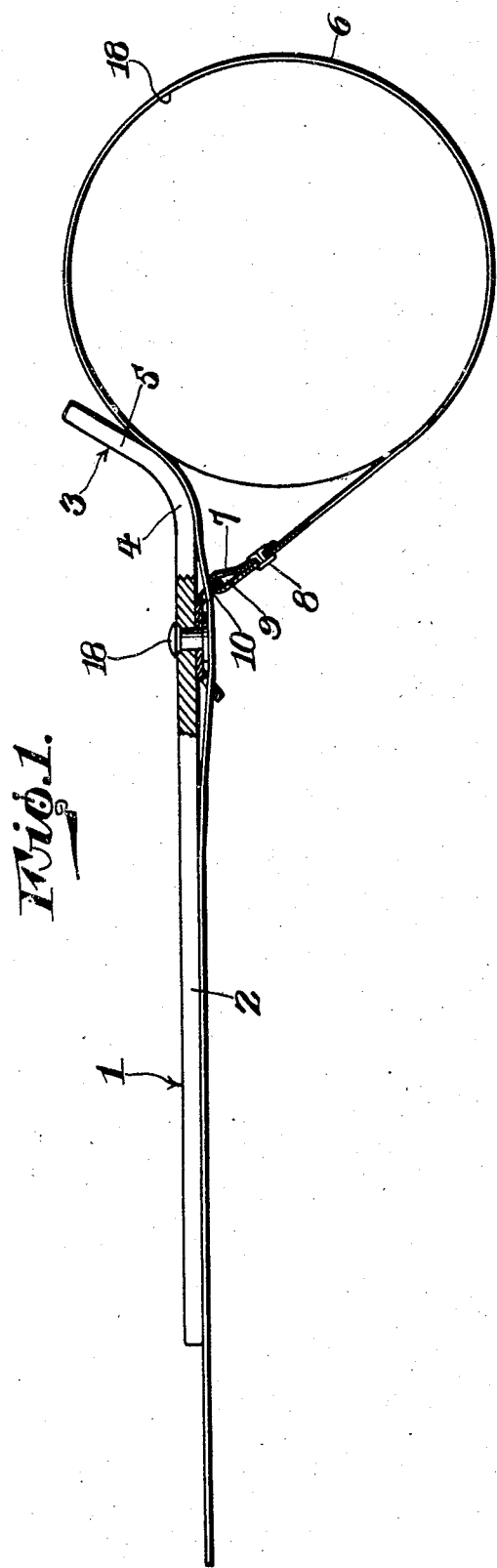
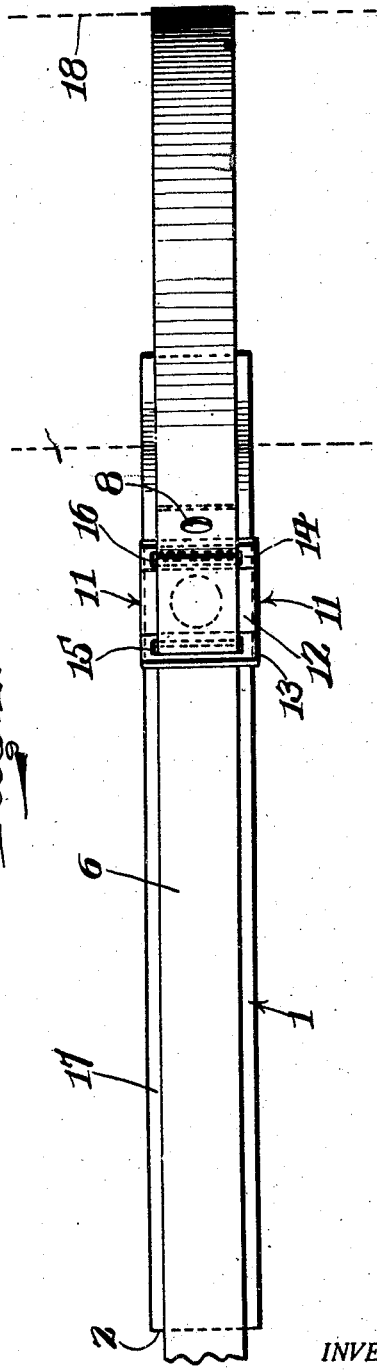
INVENTOR.
C. R. Jenkins,
BY Geo. P. Kimmel
ATTORNEY.

Patented Aug. 26, 1930

1,774,201

UNITED STATES PATENT OFFICE

CHARLES R. JENKINS, OF PARMA, MICHIGAN

HOLDER DEVICE

Application filed September 9, 1929. Serial No. 391,255.

This invention relates to a holder device designed primarily to prevent the turning of fruit jars, canned goods, or other containers when opening them, but it is to be understood that a holder, in accordance with this invention is designed for use in any connection for which it may be found applicable, and the invention has for its object to provide, in a manner as hereinafter set forth, a holder device including means for encompassing and tightly engaging with an object to prevent the turning of the latter, when occasion requires.

Further objects of the invention are to provide, in a manner as hereinafter set forth, a holder device for the purpose referred to which is simple in its construction and arrangement, strong, durable, compact, thoroughly efficient in its use, conveniently applied and operated, readily assembled and inexpensive to manufacture.

With the foregoing and other objects in view, the invention consists of the novel construction, combination and arrangement of parts as hereinafter set forth and illustrated in the accompanying drawings, wherein is shown an embodiment of the invention, but it is to be understood that changes, variations and modifications can be had which fall within the scope of the claims hereunto appended.

In the drawings wherein like reference characters denote corresponding parts throughout the several views:
Figure 1 is a top plan view of a cylindrical container showing the adaptation therewith of a holder device, in accordance with this invention, and with the device partly in longitudinal section.
Figure 2 is a side elevation of the device as applied to a container, the latter being shown in dotted lines.

The holder device can be constructed of any size device, and although it is designed primarily for kitchen use for the purpose of preventing the turning of an article, such as a can, jar or other container when occasion requires, yet the size of the device can be such that it can be applied to various uses such as holding fly wheels of motors while assembling.

The holder device includes a lever member of the desired length, thickness and width, a flexible strap of the desired length and width and preferably of less width than that of the lever member, and an attaching element carried by the lever member for the strap. Although as stated the preferred width of the strap is less than the width of the lever member, yet it is to be understood that if desired the strap can be of the same or of greater width than the lever member. The preferred width of the attaching element is the same as that of the lever member, but if the strap is of a width equaling or greater than the lever member, the width of the attaching member will be increased.

The lever member is referred to generally at 1 and comprises a handle portion 2 and a heel 3 which is disposed at an angle with respect to the handle portion 2. The heel 3 is substantially of angle form and includes an arcuate inner part 4 and an inclined outer part 5. The inner part 4 merges into the handle portion 2. The length of the parts 4, 5 can be as desired.

The strap is indicated at 6 and is of materially greater length than lever member 1. The strap can be formed of any suitable material, and has one end folded upon itself as at 7. The fold in proximity to its free edge is riveted to the body of the strap, as at 8. The fold, in connection with the body of the strap when riveted provides a loop 9. The bend between the fold and body of the strap is designated 10.

The attaching element is indicated generally at 11 and comprises a rectangular body portion substantially of a width corresponding to the width of the handle member. The length of the body portion of element 11 can be as desired. The body portion comprises a flat intermediate part 12 and a pair of oppositely disposed end parts 13, 14 arranged at an inclination with respect to and projecting from the intermediate part 12. The part 13 is arranged at the rear end of the intermediate part 12 and the part 14 at the forward end of said intermediate part. The parts 13, 14 are provided with slots 15, 16 respectively disposed transversely with respect to said body portion, spaced from said part 12 and of a length greater than the width of strap 6.

The part 12 is positioned against that side face of the lever member 1, opposite that side face which the heel 3 is disposed at an angle to. That side face of the lever member against which part 12 is positioned is termed the inner side face of lever member 1 and is indicated at 17. The part 12 is rigidly secured against face 17, in proximity to the point of mergence of handle portion 2 with heel 3, by a rivet 18. When element 11 is secured to lever member 1 the parts 13, 14 of element 11 project away from face 17, are angularly disposed with respect thereto, and slots 15, 16 are positioned in a manner for the passage of strap 6 therethrough. The part 14 of element 11 couples the looped end of strap 6 with lever member 1. The slot 16 in part 14 receives the bend 10.

When it is desired to use the device to prevent the turning of an article, such as a can indicated at 18, the strap 6 is placed in encompassing position with respect to can 18 and passed through slots 16, 15 respectively. The part 4 of the heel 3 bearing against strap 6, the latter being tightly drawn around the can, now by shifting the lever member 1 in a direction to provide for the heel 3 to bear in a direction towards the can the latter will be held from turning.

Each holder can be employed to hold cans or receptacles of various diameters. The heel 3 functions as a clamp and by way of example, is illustrated as being angularly disposed, but it is to be understood that it can be set up in any manner desired to obtain a clamping function. Although element 6 is shown as a strap it is to be understood that any type of flexible member functioning the same as strap 6 may be employed. The slot functions as a guide.

What I claim is:—

1. An article holder comprising a strap for encompassing the article to be held, a lever member provided at one end with a heel angularly disposed with respect to one side face thereof, said heel adapted to bear against a portion of said strap when the latter is in encompassing position, and an attaching element including an intermediate part and a forward and a rear slotted end part, said intermediate part being secured to the other side face of said member adjacent said heel, said end parts angularly disposed with respect to that side face of the lever member with which said intermediate part is secured, and said strap being loosely connected at one end to the forward end part and of a length to extend through said end parts when in encompassing position.

2. An article holder comprising a strap for encompassing the article to be held, a lever member provided at one end with a heel angularly disposed with respect to one side face thereof, said heel adapted to bear against a portion of said strap when the latter is in encompassing position, an attaching element including an intermediate part and a forward and a rear slotted end part, said intermediate part being secured to the other side face of said member adjacent said heel, said end parts angularly disposed with respect to that side face of the lever member with which said intermediate part is secured, said strap being loosely connected at one end to the forward end part and of a length to extend through said end parts when in encompassing position, and the slots in said end parts disposed transversely with respect thereto and spaced from said intermediate part.

3. An article holder comprising a strap for encompassing the article to be held, a lever member provided at one end with a heel angularly disposed with respect to one side face thereof, said heel adapted to bear against a portion of said strap when the latter is in encompassing position, and an attaching element including an intermediate part and a forward and a rear slotted end part, said intermediate part being secured to the other side face of said member adjacent said heel, said end parts angularly disposed with respect to that side face of the lever member with which said intermediate part is secured, said strap being loosely connected at one end to the forward end part and of a length to extend through said end parts when in encompassing position, said heel being of the same width as the width of said member and rounded at its inner portion.

4. An article holder comprising a strap for encompassing the article to be held, a lever member of rectangular cross section provided at one end with a heel angularly disposed with respect to one side face thereof for bearing against a portion of said strap when the latter is in encompassing position, said heel being of the same width as the width of said lever member and having a rounded inner portion, and an attaching element including a flat intermediate part and a forward and a rearward slotted end part, said intermediate part being secured to the other side face of said member adjacent said heel, said end parts extending at opposite inclinations with respect to each other and away from that side face against which said intermediate part is secured, said strap being loosely connected at one end to said forward end part and of a length to extend through said end parts when in encompassing position.

In testimony whereof, I affix my signature hereto.

CHARLES R. JENKINS.